US008554381B2

(12) United States Patent
Bischof et al.

(10) Patent No.: US 8,554,381 B2
(45) Date of Patent: Oct. 8, 2013

(54) METHOD AND SYSTEM FOR MONITORING AND ANALYZING ENERGY CONSUMPTION IN OPERATED CHEMICAL PLANTS

(75) Inventors: Eric Bischof, Leichlingen (DE); Johannes Eickmans, Pittsburgh, PA (US); Roland Parg, Leverkusen (DE); Andreas Jupke, Leverkusen (DE); Henning Kahnis, Köln (DE); Annette Conrad, Düsseldorf (DE); Andreas Küver, Leverkusen (DE)

(73) Assignee: Bayer MaterialScience AG, Leverkusen (DE)

(*) Notice: Subject to any disclaimer, the term of this patent is extended or adjusted under 35 U.S.C. 154(b) by 731 days.

(21) Appl. No.: 12/638,503

(22) Filed: Dec. 15, 2009

(65) Prior Publication Data

US 2010/0168930 A1    Jul. 1, 2010

(30) Foreign Application Priority Data

Dec. 17, 2008   (EP) .................................... 08021897

(51) Int. Cl.
   *G05D 11/00*   (2006.01)
(52) U.S. Cl.
   USPC ............................ 700/286; 700/266; 700/291
(58) Field of Classification Search
   USPC .................... 700/266, 286, 291, 295
   See application file for complete search history.

(56) References Cited

U.S. PATENT DOCUMENTS

| | | | |
|---|---|---|---|
| 4,146,923 A | 3/1979 | Borkan et al. | |
| 4,907,167 A | 3/1990 | Skeirik et al. | |
| 6,785,592 B1 | 8/2004 | Smith | |
| 2001/0010032 A1* | 7/2001 | Ehlers et al. | 702/62 |
| 2003/0171851 A1* | 9/2003 | Brickfield et al. | 700/286 |
| 2003/0233201 A1* | 12/2003 | Horst et al. | 702/62 |
| 2009/0012654 A1* | 1/2009 | Culp et al. | 700/291 |

FOREIGN PATENT DOCUMENTS

DE          103 343 97 A1      3/2005

OTHER PUBLICATIONS

Managing Energy Efficiency Improvement The Dow Chemical Co. Joe Almaguer Nov. 16, 2005.
Making Energy Efficiency Pay John Harrison, SAP AG Chemical Engineering Aug. 2008.

* cited by examiner

*Primary Examiner* — Mohammad Ali
*Assistant Examiner* — Nathan Laughlin
(74) *Attorney, Agent, or Firm* — Norris, McLaughlin & Marcus, P.A.

(57) ABSTRACT

A computer-implemented method for monitoring and analyzing energy consumption of a chemical plant in operation. Plant type specific theoretical energy consumption optimum value based on a corresponding modeled plant are determined, parameters contributing to increased energy consumption are identified and grouped. Energy consumption of a plant is periodically graphed starting from the theoretical energy consumption optimum value and getting up as an energy cascade to a current energy consumption, by adding the provided, partly retrieved single energy consumption rates of the respective parameters in groups such that the resulting energy cascade allows to monitor at least a part of the individual parameters and to automatically compare the current energy consumption of the at least one plant with an energy consumption of another plant and/or with a previous energy consumption of the at least one plant with respect to the individual parameters. Furthermore, an appropriate system is provided.

16 Claims, 1 Drawing Sheet

METHOD AND SYSTEM FOR MONITORING AND ANALYZING ENERGY CONSUMPTION IN OPERATED CHEMICAL PLANTS

BACKGROUND OF THE INVENTION (1) Field of the Invention

The present invention relates to a method and system for monitoring and analyzing energy consumption in operated chemical plants.

(2) Description of Related Art

BACKGROUND

U.S. Pat. No. 4,146,923 describes a system for controlling a plurality of variable rate consuming units using a unique sequence to optimize the number of units on and the total consumption of the units relative to a target by increasing and decreasing total consumption from a status position in said sequence in response to a comparison of the total consumption of all units with a target and to a comparison of the total consumption with the target minus the differential consumption to the next step from the status position in the unique sequence. The units' status and the results of the comparisons address a device storing that unique sequence to provide a consumption requested status which may be overwritten by a cycling means to provide a minimum and maximum off time and minimum on time demand command status for demand controllable units. The US patent refers to the performance of an energy network which is to be controlled and optimized. Thereby, the energy consumption of multiple energy users which are driven in different load status, respectively, is to be controlled and compared via logical compositions with a target. The basic idea is to establish a sequence in which the most efficient energy users of the entirety of energy users, which are driven in partial load are allowed to increase the load in order to enhance the total energy balance. The determination of the target is geared to findings of a learning system.

U.S. Pat. No. 4,907,167 discloses an integrated system for process control in which a process supervisor procedure defines parameters for one or more controller systems or controller procedures. The supervisor procedure changes control parameters only in discrete changes and the decision to act is sufficiently constrained that every change must be a significant change. Every change is logged or otherwise reported out to human experts. Since every change is significant the history of changes will provide a meaningful record which can be reviewed by human experts.

U.S. Pat. No. 6,785,592 aims at optimizing energy procurement, energy demand and energy supply for a facility or complex by a specific methodology. Thereby a baseline model is ascertained and energy consumption is monitored and adjusted to reflect dynamic economic factors of operations. With the accumulation of data, contract negotiations with energy suppliers may provide further energy savings. Over time and patterns of usage determined further savings and optimization in energy, equipment, staffing and other operational areas are obtained. A remote access provides efficient monitoring of established systems. The energy management of internal processes is supported according to this US patent by measures, their respective verification and a reporting structure. For establishing of this structure an actual situation of the energy users, consisting of an internal evaluation, a comparison evaluation (benchmarking) and a profiling is performed.

The published patent application DE 103 343 97 A1 teaches a procedure which primarily refers to a minimization of energy costs. This task is solved by generating and collecting data in a knowledge database which are used for a target deviation. The control of success of the project development is performed by documentation and annual verification of the achieved results.

In Chem. Eng. August/08, 34 ff., J. Harrison describes a method provided by SAP Industry Value Network for an energy management of industrial plants. Harrison describes that also stealthy changes can be made visible and differentiated from unique events. The proposed method is to be understood as a pre-analysis since further compressed data are inputted in a Kaizen system which leads to a complex and complete energy management which includes among other things energy effects of the logistical chain.

In 2008, Dow Chemical Corp. published a management system directed to managing energy efficiency improvements. According to such management system an energy reporting is installed and a communication structure among the employees is established. Identified improvement projects are handled by using the so-called Six Sigma Method.

Comparative assessment methods are limited generally to the comparison of similar facilities. In the case that there are no similar facilities or the respective data are not available, the method proposed by the prior art cannot be applied. Even when the published methods can be applied, individual differences of the otherwise similar facilities are to be taken into account. The results are thus dependent on the reporting of the participating persons.

Generally, analytical methods aim at generating some kind of proposal. Those proposals are documented in an appropriate list and successively executed. A control not quite possible because every activity is to be evaluated individually. Moreover, not every activity is accessible by the respective central management. An objective prioritization and tracking of different factors over a longer period of time is only hard to achieve.

It is often the case that a continuous incremental improvement can be achieved by trial and error. Those improvements go beyond what can be achieved by analytical methods (list of actions) and comparative methods (benchmark).

Generally, numerical values obtained by a so-called per gap analysis or benchmarking are useful, but do not allow per se an improvement of a such numbered improvement potential since the relevance of the numerical difference can generally not be made visible. A person skilled in the art often has experience with the quantitative determination of individual details of the plant which influence the performance. However, he often does not overview the complexity of parameters influencing each other in every operative status of the facility in order to implement thereon an overall comprehensive improvement management.

Moreover, no present system currently allows to distinguish windfall gains, such as energy savings by production rates, from sustainable gains, which usually denote an overall efficiency improvement and which are the achievements which have to be recognized and then managed to become sustainable achievements. Therefore, it is highly desirable that a methodology be invented, which would allow the analysis and visualization of a chemical plant's energy usage while bearing features capable of distinguishing windfall effects from sustainable efficiency gains.

The prior art provides no solution which defines a procedure according to which the performance of a facility can be characterized formally and abstractly such that a presentation of deviations from an optimum are possible so that different facilities can be opposed with each other in a comparative manner.

Therefore, there is a need to provide a possibility for a lasting and continuous monitoring and analyzing of energy consumption for respective chemical plants. Thereby, it is desirable that the monitoring and analyzing procedure provides the user with a complete transparency and a direct feedback about the success of interim actions and of a categorization into one-time and systemic efficiency effects.

BRIEF SUMMARY OF THE INVENTION

According to the invention, this objective is achieved in that a computer-implemented method for monitoring and analyzing energy consumption of at least one operated chemical plant includes determining a plant type specific theoretical energy consumption optimum value based on a corresponding model plant, identifying and grouping parameters contributing to an increased energy consumption of the plant due to processes running in the plant, due to internal characteristics of the plant, due to operating conditions of the plant, respectively. The method further includes providing energy contribution rates of the respective parameters, partly by an automatic, where required periodic retrieval, particularly an on-line retrieval, and periodically graphing the energy consumption of the at least one plant via a bar graph starting from the plant type specific theoretical energy consumption optimum value and arriving at a current energy consumption of the at least one plant by adding the provided single energy consumption rates of the respective parameters in groups, thus forming an energy cascade which allows to monitor at least a part of the individual parameters and to compare, partly automatically, the current energy consumption of the at least one plant with an energy consumption of another plant and/or with a previous energy consumption of the at least one plant with respect to the individual parameters. The period for a retrieval of contribution rates of respective parameters and the period for graphing the energy consumption can be every suitable time period, respectively, such as a month, a year or any other time period. Although automatic or semi-automatic data retrieval and consolidation of the retrieved data is a routine operation for a person skilled in the art, it was accidentally found that a grouping of portions of the raw energy consumption data into different categories and the combination of those categories with a theoretical referral (the above-mentioned model-based theoretical energy consumption optimum value) allows for the transformation of energy usage data into energy efficiency data, thus creating a self-calibrating performance scale which is suitable for periodic monitoring and which can serve as the basis of a management system.

The expression "chemical plant" according to this invention primarily denotes all kinds of installations which are used to carry out standard conversion of matter typically used in the chemical industry, such as catalytic conversions, hydrogenations, oxidations, liquid-, solid- and molten-phase electrolytic processes, polymerization reactions, distillation operations and the like. The cited examples should not withstand a broader definition of the term "chemical plant", which also includes all installations used to convert or treat matter into other forms of matter, be it a chemical transformation such as a condensation or a polymerization, or a physical transformation e.g. purification by means of distillation or crystallization, pervaporation etc. Therefore chemical base products, petrochemical feedstocks, fossil fuels, pulp and paper, ceramic (such as china) bulk materials, galvanic layers, any kind of bulk metal or alloy, certain food compositions, any kind of glass and glassware, cement, gypsum, glues and adhesives, resins, paints, surface coatings, functional materials such as nanoparticles, fertilizers, active crop-protecting ingredients and their formulations or preparations into end-user products, active pharmaceutical ingredients and their conversions into pills, ointments, tonics, syrups and the like are also understood to be manufactured in chemical plants under the scope of this invention, notwithstanding other conversion processes which could be found to fall under the same definition.

However, the method according to the invention and its implementation features, may also be applied in another aspect of the invention to other kinds of installations for energy consuming conversion-processes in their broadest sense, which includes but is not limited to processes as: processing of plastics, metals, fibres or food raw materials into bulk or end products, assembly of parts into machinery or automobiles, production of household items or machinery and the like. Such processes can also benefit from the proposed inventive categorization-monitoring-feedback loop in terms of being treatable by means of this proposed new method for the optimization of energy efficiency of chemical plants.

According to an implementation the energy consumption of the at least one plant is normalized using the plant type specific theoretical energy consumption optimum value, thus allowing a plant type independent comparison of the energy consumption of the at least one plant with an energy consumption of another plant with respect to the individual parameters.

It is possible that the steps of determining the plant type specific theoretical energy consumption optimum value based on a corresponding model plant and of identifying and grouping the parameters are performed according to a well-defined procedure which is suitable to be standardized.

According to an implementation the model plant is planned as an ideal plant for producing a specific product exempt from further influencing factors such as characteristics of a location infrastructure and economies of scale. Those further influencing factors are taken into account by and are subsumed under the parameters due to processes running on the respective plant.

It is possible to introduce intermediate stages within the progression of the energy cascade, each such intermediate stage allowing for a class of parameters contributing to an increased energy consumption of the plant. Thus, one intermediate stage can be defined as a plant energy optimum which takes into account, starting from the plant type specific theoretical energy consumption optimum value, the chemical process(es) running in the plant and an infrastructure associated with the plant.

A further intermediate stage can be defined as an operational energy optimum which takes further into account, starting from the plant energy optimum, internal characteristics of the plant, such as instrumentation gaps, categorized depending on the amount of capital required to surmount the gap, into large equipment, and small equipment.

In order to reach the final stage of the energy cascade, namely the current energy consumption, operating conditions are further considered in the intercept of the energy cascade.

It has accidentally been found to be very useful that the parameters due to operating conditions of the plant are classified/subdivided into static parameters and dynamic parameters, respectively.

Furthermore, according to a further implementation, the step of periodically graphing the energy consumption of the at least one plant via a bar graph starting from the plant type specific theoretical energy consumption optimum value and getting up as an energy cascade to a current energy consumption of the at least one plant by adding the provided, partly retrieved single rates of the respective parameters in groups comprises a periodically still more often repeated re-graphing of the rates of the dynamic parameters associated with the operating conditions of the plant. That means that particularly the dynamic operating conditions of the plant are monitored in shorter time intervals than the rest of the other influencing factors. This shorter time interval is to be chosen in dependence on experienced data with respect to the fluctuation of the respective operating conditions. A monthly, daily or even shorter monitoring and thus a monthly, daily or correspondingly shorter re-graphing of exactly those corresponding parameters in the energy cascade might be appropriate. Such an online monitoring ensures sustainability of operational improvements.

Thereby, it is also contemplated that the method further comprises the step of computing for at least one of the dynamic parameters of the energy cascade a best demonstrated mode, thus demonstrating an expected proportion of the respective energy contribution rate of the at least one parameter. It is evident for a person skilled in the art, that such kind of best demonstrated mode can be computed for any number of the entirety of the defined parameters, respectively.

The best demonstrated mode may be derived from a history of the energy contribution rates of the at least one parameter measured over the course of a pre-defined time period wherein a pre-given percentage of the lowest of those energy consumption rates is used for determining the best demonstrated mode. This percentage may be in the range of 1% to 20%, particularly about 10%. The energy contribution rates of the at least one parameter may continuously be monitored and controlled on the basis of the best demonstrated mode.

Furthermore, it is further contemplated to use the best demonstrated mode to build a predictive model of pattern of behavior of the respective at least one parameter over time. This can be done naturally for any suitable number of the entirety of the afore identified parameters.

Furthermore, the best demonstrated mode may continually be refined in response to new measurements of the energy contribution rates of the at least one parameter.

According to a further implementation the best demonstrated mode is used to build a temporary model of the current behavior of the at least one parameter.

According to another aspect, the operating conditions contributing to an increased energy consumption are taken from the group consisting of operation of the plant at partial load in comparison to full load, down time of the plant, and product mix processed by the plant. The remaining unidentifiable operating conditions contributing to an increased energy consumption are globally summarized as losses.

According to yet another aspect, it is possible that the method further includes that an alarm is triggered when the energy consumption rate of the at least one parameter is detected to deviate unexpectedly from the best demonstrated mode.

According to still a further aspect, a computer-program product tangibly embodied in an information carrier comprises instructions that when executed cause a processor to perform an afore-mentioned method to monitor and analyze energy consumption of at least one operated chemical plant.

According to the proposed method, value targets are gained by using an idealized optimum for an operated chemical plant such that a gap between an actual state and an ideal state can be made visible. By graphing of the energy consumption it becomes possible to visualize a level of performance at any time. Tracking and steering energy efficiency improvements can be achieved.

Furthermore, the method allows a realization of a consistent monitoring and a control system which leads to comparative indicators (key performance indicators), thus allowing a comparison of different products and different technologies. The proposed method takes into account that a measured energy consumption consists of different contributions. Furthermore, according to the proposed method an automatic assignment of the various contributions to the energy consumption to appropriate categories is realized. Thereby, different influencing factors can always be taken into account and made visible for a respective user.

According to the proposed method the first step refers to a determination of a plant type specific theoretical energy consumption optimum value based on a corresponding model plant. That means that primarily a plant has been modeled and the respective energy consumption optimum value has been derived therefrom. The performance data of this optimum configuration has been computed by means of respective IT tools, partly in combination for the energy consumption with, for example, ASPEN+, VT Plan and Excel™ programs. The so computed optimum value includes those characteristics which are given by laws of nature, but do not comprise any further loss sources which are normally present in reality.

As further proposed by a possible implementation of the claimed method the computed plant type specific theoretical energy consumption optimum value can be used for performing a normalization of an actual state of a respective operated chemical plant by using this optimum energy consumption value as a normalizing factor.

Furthermore, a further dimensionless factor can be computed based on the plant type specific theoretical energy consumption optimum value according to the following formula:

$$T^2 = TO/CC$$

wherein TO corresponds to the theoretical energy consumption optimum value and CC corresponds to the current consumption of the respective operated chemical plant.

This computed dimensionless factor allows a comparison of different methods, technologies and even products which are to be manufactured by means of respective chemical plants.

According to the general proposed method, after determining a plant type specific theoretical energy consumption optimum value based on a corresponding modeled plant, it is further proposed to identify and group parameters contributing to an increased energy consumption of the plant due to processes running on the plant, due to internal characteristics of the plant, due to operating conditions of the plant, respectively. That means that energy consumption sources have to be identified and then classified with respect to their respective sources. According to such a classification the found and identified parameters have to be grouped accordingly. After that, according to a further method step the respective energy contribution rates of the respective parameters have to be provided, partly automatically, and whenever required periodically, retrieved. By usage of the classified parameters together with their respective energy contribution rates, the energy consumption of the at least one operated chemical plant is graphed via a bar graph starting from the theoretical energy consumption optimum value and arriving at a current energy consumption of the at least one chemical plant by adding successively the provided, partly automatically retrieved single energy consumption rates of the respective parameters in groups, thus forming an energy cascade which allows to monitor, particularly to online monitor at least a part of the individual parameters and to compare, particularly automatically, the current energy consumption of the at least one plant with an energy consumption of another plant and/or with a previous energy consumption of the at least one plant with respect to the individual classified parameters. That means that the different grouped parameters are to be arranged in the form of an energy cascade. Besides those energy consumption sources which could be identified concretely, a further category is to be introduced in which all effects without explicit assignment to any one of the concrete categories are to be summarized. Since the categorized sources of energy consumptions can be quantified by the respective provided, partly retrieved energy consumption rates, the presentation of the respective energy cascade clearly reflects the performance of the respective operated chemical plant with regard to the different identified energy consumption sources and, thus, gives a possibility to enhance studiously performance by regarding the single parameters contributing to the energy consumption of the whole plant. Thereby, it is possible to introduce priorities for the different parameters according to which an enhancement of the performance of the underlying operated chemical plant is to be addressed.

The presentation of the energy consumption of a respective operated chemical plant in form of an energy cascade allows a clear and unambiguous analysis of a deviation of the energy consumption of the real underlying operated chemical plant from the plant type specific theoretical energy consumption optimum value based on a corresponding modeled plant. This deviation analysis which can be derived from the energy cascade can be used in order to prioritize measures to be performed in order to decrease the energy consumption by decreasing single selected energy consumption rates of specific parameters. There are several categories in which it may seem to be difficult to achieve an enhancement concerning the energy consumption rates of the included parameters. However, it will most probably be possible to achieve easily an enhancement with respect to an energy consumption in another category comprising parameters which can be easily influenced. Thus, efficient improvements of the overall energy consumption become possible.

According to another aspect, an energy management system includes a modeling means configured to determine, based on a modeled plant, a plant type specific theoretical energy consumption optimum value, an analyzing means configured to identify and group parameters contributing to an increased energy consumption of the plant due to processes running on the plant, due to internal characteristics of the plant, due to operating conditions of the plant, respectively. The proposed system further comprises a provisioning means configured to provide energy contribution rates of the respective parameters, the provisioning means comprising a retrieval means configured for an automatic, and whenever required periodic retrieval of energy contribution rates of at least a part of the respective parameters. Furthermore, the proposed system comprises a monitor and control means configured for periodically or real-time graphing the energy consumption of the at least one plant via a bar graph starting from the theoretical energy consumption optimum value and arriving at a current energy consumption of the at least one plant by adding the provided, partly retrieved single energy consumption rates of the respective parameters in groups, thus forming an energy cascade which allows to monitor, if applicable to online monitor, at least a part of the individual parameters and to compare the current energy consumption of the at least one plant, particularly automatically with an energy consumption of another plant and/or with a previous energy consumption of the at least one plant with respect to the individual parameters.

It is possible that the monitor and control means of the proposed system is further configured to present the energy consumption of the at least one plant normalized using the plant type specific theoretical energy consumption optimum value, thus allowing a plant type independent comparison of the energy consumption of the at least one plant with an energy consumption of another plant with respect to the individual parameters.

The modeled plant used by the proposed system may be planned as an ideal plant for producing a specific product.

Furthermore, the monitor and control means may be configured to periodically still more often re-graph the energy consumption rates of the parameters associated with the operating conditions of the plant. This means that the time interval for re-graphing the energy consumption rates of those parameters may be chosen shorter than the period chosen for the graphing of the energy cascade as a whole. Thereby, it is taken into account that those parameters might change more often. The respective time interval for the re-graphing with respect to those parameters is to be chosen accordingly.

According to a further implementation of the proposed system the monitor and control means is further configured to compute for at least one of the parameters of the energy cascade a best demonstrated mode, thus demonstrating an expected proportion of the respective energy contribution rate of the at least one parameter. This expected proportion is to be interpreted as being attributed to the real situation in contrast to the fictitious situation of the model plant.

It is possible that the best demonstrated mode according to a further implementation is derived from a history of the energy contribution rate of the at least one parameter measured over the course of a pre-defined time period wherein a pre-given percentage of the lowest of those energy consumption rates is used for determining the best demonstrated mode. In that instance, pre-defined time period can be in the range of several hours to several months or even several years. The percentage can be chosen, for example, from 1% to 20%.

The monitor and control means may further be configured to continuously monitor and control, on the basis of the best demonstrated mode, the energy contribution rates of the at least one parameter.

According to a further implementation of the proposed system, the best demonstrated mode is used by the modeling means to build a predictive model of a pattern of behavior of the respective at least one parameter over time. The best demonstrated mode may be continually refined by the monitor and control means, in response to new measurements of the energy contribution rates of the at least one parameter retrieved from the retrieval means. The best demonstrated mode may further be used by the modeling means to build a temporary model of the current behavior of the at least one parameter.

According to yet another implementation of the proposed system the operating conditions contributing to an increased energy consumption are to be taken from the group consisting of an operation of the plant at partial load, down time of the plant, and product mix processed by the plant.

The monitor and control means of the proposed system may further be configured to trigger an alarm when the energy consumption rate of the at least one parameter is detected to deviate unexpectedly from its best demonstrated mode.

The present disclosure is based on the recognition that each operated chemical plant has different parameters which contribute to an increased energy consumption of the respective plant and which can be grouped according to their respective kind of influence to the energy consumption, namely due to processes running on the plant, due internal characteristics of the plant, or due to operating conditions of the plant. The processes running on the plant are generally technological processes, i.e. specific to a sector of chemistry whose main focus contains the sector-specific know-how of the respective chemical plant. In the case of a production plant, this is the respective production process. Also relevant in terms of energy is in connection with the processes running on the plant a purchase of energy, for example a purchase of electricity, gas, oil, water, and a discharge of energy, for example a discharge of $CO_2$ emissions, and waste water. This item can be attributed to the infrastructure of the plant. Furthermore, there are operational parameters due to internal characteristics of the plant. These are determined, for example, by the internal characteristics of the plant itself, such as the complexity of the plant. The parameters due to operating conditions of the plant are determined by the kind of operation of the plant, i.e. whether the plant is driven under partial load or full load, by a down time of the plant and by a product mix which is used for the underlying process. There are other operating conditions of the plant which have to be taken into account and which will be summarized in the following as so-called "losses".

For a lasting reduction in the energy consumption, the present disclosure provides for an energy consumption of at least one operated chemical plant to be considered as an energy cascade taken all parameters, contributing to the increased energy consumption of the plant with respect to a plant type specific theoretical energy consumption optimum value based on a corresponding modeled plant into account, and for analyzing this energy consumption with respect to potential energy reductions which are to be determined. Including all parameters or at least all core parameters contributing to an increased energy consumption of the operated chemical plant due to different aspects in considerations for reducing the energy consumption a detailed analysis of the different parameters and thus a lasting and comprehensive reduction in the energy consumption rates of the respective parameters is made possible. It is only by considering the resulting energy cascade as envisaged by the present disclosure that a chronological and partial distribution of all energy contribution rates in large and complex chemical plants can be registered and all potential energy reductions can be determined and exhausted.

It is possible to normalize the individual energy consumption rates of the energy cascade by dividing the respective energy consumption rates through the determined plant type specific theoretical energy consumption optimum value based on a corresponding modeled plant so that a plant type independent comparison of the energy consumption of the at least one plant with an energy consumption of another plant with respect to the individual parameters is possible. Since the whole energy cascade can in principle then be considered irrespective of the specific plant a benchmark that is independent of the specific plant is possible in the analysis of a current state of the chemical plant. Such a benchmark can indicate potentials for reducing the energy consumption. The present disclosure proposes to take into account all influencing parameters in detail such that individual energy consumption rates can be determined and allocated to specific consumers. Energy flows can be followed and energy-relevant data can be stored and analyzed. For example, the influence of production planning on the energy consumption can be ascertained.

By means of the proposed method which can be standardized in an overall consideration, a determination of potential energy reductions for the at least one operated chemical plant is possible while transparency and consistency in the whole process is guaranteed. Thus, a comprehensive and systematic analysis of energy reductions of the at least one operated chemical plant is made possible and a determination of potential energy reductions and an elaboration of measures for reducing energy consumptions are made easier. With the aid of the proposed method, experience and best practice which is already available in a large number of operated chemical plants can be utilized jointly and benchmarks can then be made for example with an average for the specific chemical process which is to be run on the respective chemical plant. Furthermore, by means of the proposed method a systematic working on clearly defined rules is made possible and quality control and assurance is made easier. In spite of a possible high complexity of an operated chemical plant all potentials for reducing energy consumptions can thus be determined and exhausted.

In the present case, the proposed method comprises a number of steps which are suitable to be standardized. By means of such a stepwise procedure, it becomes possible to compare different plants despite their inherent complexities (see [0054]).

Once the attribution of energy consumption contributions has been carried out in such a standardized and straightforward way, some of the categories offer a multitude of energy savings potentials to be harvested. E.g. the category "partial load" corresponds to the specific energy losses when the production unit is under partial load. While this contribution becomes clearly visible using this system, this visibility creates two opportunities:

(i) the unit's management can strive to plan the production output in such a way, that partial load will be avoided as much as possible, thus energy losses due to operating the unit under partial load will be greatly avoided and the amount of avoided energy waste can be planned, and (ii) the unit's management can further strive to optimize the unit's energy consumption characteristics under partial load when partial load cannot be avoided.

The latter becomes easy as the disclosed system continuously provides the user with best demonstrated mode characteristics and predictive models based on the latter or on fundamental natural laws.

Consequently, production managers cannot only react to changes and design their actions accordingly to minimize the energy consumption under given circumstances, but can also plan the future energy consumption by using their projections on partial load, the available information on best demonstrated mode characteristics and the predictive model which is a system feature.

Further elaborating on planning capabilities of the system, the system could be used to assess, manage and optimize energy consumption properties of similar or different plants in entirely different locations. Once the energy consumption situation of a respective plant has been measured and assigned to the different categories of the energy cascade, and once best demonstrated modes of respective parameters and other properties of the plant have been set up to function with the disclosed method, comparisons of the plants can be carried out regardless of the specific nature and location of the plant. Plants can e.g. be compared regarding the steepness of their partial load (based on best demonstrated modes) curves, with this comparison providing stimulus to look for the reasons behind the occurring differences. Supervisory management could periodically review the differences, the improvement plans of the inferior units and the degree of fulfillment of those plans after an agreed-upon timeperiod. Summarizing, the disclosed method and system again provide deeper insight into the energy efficiency properties of a plant, and thus enable plant management to more specifically address suboptimal equipment configurations and practices. Using the disclosed method and system, this improvement process happens more directed than without it, because categorization and the analytic tools of the system provide additional guidance and enablers for such highly efficient improvement process. One of the true values of the proposed invention therefore lies in the accidental finding that a transformation of usage data into efficiency data by means of a reference and standardized categories allows for the management of energy efficiency at all levels, namely from the operator level up to the board of management, because the intuitively selected categories provide a universal system for the grouping, monitoring and comparison of efficiency data. Another finding of the described invention had been that this kind of grouping also provided the basis for aggregated efficiency representations, meaning that using the proposed system provides a common denominator for the individual plant data to be aggregated into a e.g. chemical site energy efficiency representation, the term chemical site denoting a number of chemical plants located at the same site. While a tangible linkage of loss categories to practical measures to improve a system's energy efficiency certainly gets lost when such an aggregated representation is used, upper management will still find it useful to compare their global sites' energy efficiencies against each other using the proposed methodology.

Therefore, the value of the core of the present invention, which is the transformation of usage data into grouped efficiency data by using referrals based on solid science and analysis of a plant's best demonstrated practice, cannot be underestimated as it creates an entirely new approach to determining and managing energy efficiency at various installation and management levels.

An initial assessment of the operated chemical plant with regard to existing potentials for reducing the energy consumption rates of the individual parameters is made possible by the fact that with the aid of the proposed diagnostic method the energy consumption is analyzed, individual parameters contributing to an increased energy consumption are identified and grouped according to their respective origin. Thereby, weak points can be identified and measures for improvement can be implemented.

Since the energy cascade in a normalized form can be viewed as independent of the individual chemical plant, the diagnosis thereof permits a comparison among a large number of chemical plants. Furthermore, the assessment of the chemical plant is possible in a simple and rapid way.

Following the analysis of the different parameters contributing to an increased energy consumption of the chemical plant which is realized in form of a periodically graphing of the energy consumption via a bar graph as an energy cascade, weak points can be clearly identified and measures for improvement can be proposed. Due to periodic re-graphing, changing boundary conditions may lead to a re-assessment with new properties for improvements.

In the scope of the proposed monitoring and analyzing method standardized concepts, standardized calculation models and standardized process analysis for determining potentials for reducing energy consumption rates of the individual parameters can be used. It is possible to make use both of best practice and already available experience. During the proposed analysis, recourse may be made to successful and proven concepts, calculation models and process analyses and, therefore, enables particularly good potential savings to be determined.

In a further step detailed planning of improvement measures for reducing energy consumption rates and, in still another step an appropriate implementation can be carried out.

A particularly lasting reduction in energy consumption is made possible by the fact that the steps of periodically graphing the energy consumption of the at least one plant via a bar graph starting from the plant type specific theoretical energy consumption optimum value and arriving at an energy cascade to a current energy consumption of the at least one plant by adding the provided, partly retrieved single rates of the respective parameters in groups and forming an energy cascade comprises a periodically still more often repeated re-graphing of the rates of the dynamic parameters associated with the operating conditions of the plant. The repetition of the graphing of the rates as a whole after a time interval, in particular at the latest after a year, makes it possible to check whether measures have been implemented correctly. Secondly, the effectiveness of those measures for reducing the respective energy consumption rates and the achievement of best practice can be checked and a suitable reporting form is chosen for the respective level of management involved in the reporting and analysis.

The details of one or more implementations are set forth in the accompanying drawings and the description below. Other features will be apparent from the description of the drawings and from the claims.

DETAILED DESCRIPTION OF THE INVENTION

Figure 1:
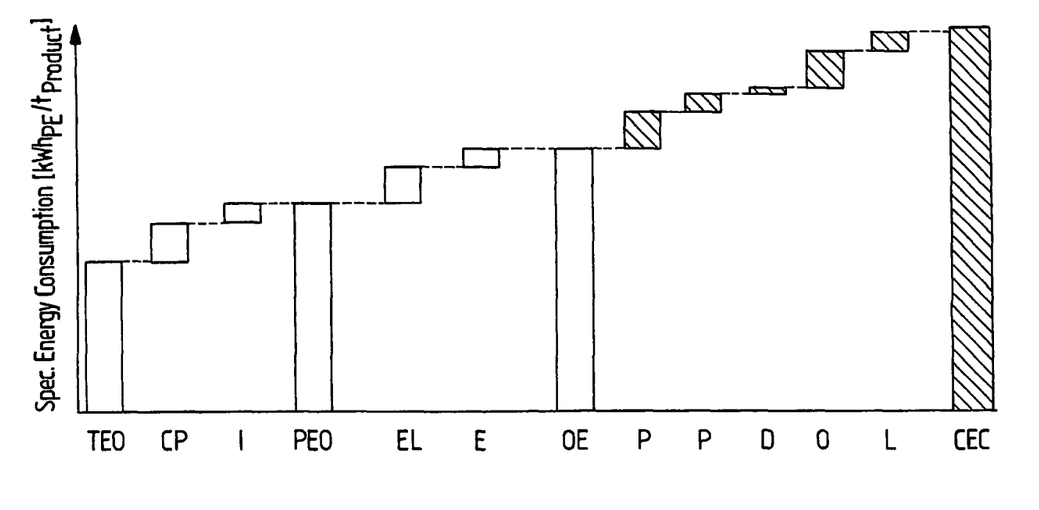
FIG. 1 shows a schematic representation of an energy cascade as provided by a possible embodiment of the proposed method.

FIG. 1 shows a schematic presentation of an energy loss cascade as provided by an implementation of the proposed method for monitoring and analyzing energy consumption of an operated chemical plant. The energy cascade as shown in FIG. 1 is represented as a bar graph starting from a theoretical energy consumption optimum value TEO and getting up as an energy cascade to a current energy consumption CEC of the underlying operated chemical plant by adding afore-provided, partly afore-retrieved single energy consumption rates of respective afore-identified parameters in groups. The parameters contributing to an increased energy consumption of the plant with respect to the plant type specific theoretical energy consumption optimum value TEO are first identified and grouped accordingly with respect to their corresponding origin. The energy consumption is shown in FIG. 1 as a specific energy consumption in terms of $kWh_{PE}/t_{product}$, wherein the index PE stands for Primary Energy. In the following there are detailed explanations why the specific energy consumption is to be given in terms of $kWh_{PE}/t_{product}$.

Primary energy is energy contained in raw fuels and any other forms of energy received by a system as input to the system. The concept is used especially in energy statistics in the course of compilation of energy balances. Primary energy includes non-renewable energy and renewable energy.

Primary energies are transformed in energy conversion processes to more convenient forms of energy, such as electrical energy and cleaner fuels. In energy statistics these forms are called secondary energy. Secondary energy is an energy which has been transformed from one form to another. Electricity is the most common example being transformed from coal, oil, natural gas, wind, etc.

For the sake of comparability, it is crucial to define factors for the energy management system, which make consumptions of various forms of secondary energy comparable. In order to achieve this, the transformation process from primary energy to secondary energy is applied backwards using accepted factors. It is in principle up to the team applying the system to define and agree upon those factors. As a standard, the following transformations are normally used:

$$1 \text{ kWh (electrical)} = 1 \text{ kWh (PE)}/0.40$$

$$1 \text{ kWh (steam)} = 1 \text{ kWh (PE heat content of steam)}/0.9$$

$$1 \text{ kWh (cooling energy)} = (1 \text{ kWh (PE)} * 0.40) * COP,$$

wherein COP=coefficient of performance of the cooling device

These equations are based upon commonly achieved efficiencies. They disregard the efficiency of a local system which supplies a production plant, but create the situation of total comparability of various plants consuming secondary energy and also illustrate the effects of substituting one form of secondary energy with another correctly. In order to follow different goals, like benchmarking and comparing in-plant generations of steam with best-in-class installations, one could use more ambitious efficiency factors in the equations shown above to design the management system in the desired fashion.

The first group of parameters which can be identified for an operated chemical plant can be classified as parameters due to processes running on the respective chemical plant which generally underlie a strategic decision. These parameters comprise inter alia the chemical processes running on the respective chemical plant and an infrastructure in which the respective chemical plant is operating. For each of those identified and classified parameters respective energy contribution rates can be determined and provided and added to the energy consumption optimum value TEO which is represented in FIG. 1 by the respective bars identified as CP and IS, respectively. By adding to the energy consumption optimum value TEO the two respective energy contribution rates of the chemical processes CP and the infrastructure IS an energy consumption value PEO is reached which can be called a "plant energy optimum" taking into account a specific chemical process CP and a specific given infrastructure IS.

Starting from the plant energy optimum PEO there are further parameters which contribute to a further increase of the energy consumption of the underlying operated chemical plant, namely, due to internal characteristics of the plant. This can be, for example, a specific existing but suboptimal piece of equipment which is installed in the underlying chemical plant. A measure to overcome the disadvantages associated with this piece of equipment involving the installation of a larger and/or costly hardware is abbreviated EL (for equipment large) and, following the same logic, a measure involving a hardware project with lower cost is abbreviated ES (for equipment small). The terms large and small equipment actually refer to an amount of capital required to eliminate this excessive energy consumption. Again, for each of those parameters contributing to an increased energy consumption of the plant respective energy contribution rates have to be provided, partly retrieved, which are then to be added to the already computed plant energy optimum PEO, thus, further getting up in the energy cascade to a so-called operational energy optimum OEO identifying a further classification step in the whole energy cascade. The parameters identifying the energy cascade between the plant energy optimum PEO and the operational energy optimum OEO can be classified as parameters due to internal characteristics of the plant. Those parameters can be influenced by providing a change in the respective hardware configuration, thus, enhancing their respective energy contribution rates.

Starting from the operational energy optimum OEO there is a series of further parameters contributing to a further increase of the energy consumption of the respective chemical plant, those parameters being due to operating conditions of the plant. This last group or class of parameters is generally of dynamic nature. In contrast thereto, the parameters due to processes running on the plant and to internal characteristics of the plant are generally of static nature.

The last group of parameters comprises inter alia parameters contributing to an energy increase due to a kind of operation of the plant, for example, operation of the plant at partial load PL, a downtime DT of the plant, a product mix PM processed by the plant, and plant operational parameters indicated as OP, each of those parameters contributing by a specific retrieved energy contribution rate to the energy consumption of the whole plant as indicated by the respective single columns. All parameters which cannot be unambiguously assigned to an underlying loss source are grouped here in the category "losses" indicated as LS. By adding all the single energy consumption rates to the afore-determined operational energy optimum OEO the current energy consumption of the underlying chemical plant CEC is reached. The last group of parameters due to operating conditions of the plant are, as already mentioned, generally of dynamic nature and, therefore, it seems to be important to perform periodic repeated retrieval and re-graphing of the respective energy consumption rates of those dynamic parameters associated with the operating conditions of the plant in order to get a reliable analysis of the energy consumption of the operated chemical plant. The period for the repeated retrieval and re-graphing of the respective energy consumption rates of those parameters might be smaller than a period chosen for the periodic provision and graphing of the energy consumption rates of the entirety of parameters.

Furthermore, it seems to be suitable to compute for at least one or some of the parameters of the energy cascade a so-called best demonstrated mode which demonstrates an expected proportion of the respective energy contribution rates of the corresponding parameters. The best demonstrated mode can be derived from a history of the energy contribution rates of the respective parameters measured over the course of a pre-defined time period wherein a pre-given percentage of the lowest of those energy consumption rates is used for determining the best demonstrated mode, respectively.

On the basis of such a determined best demonstrated mode, the energy contribution rates of the respective parameters can be continuously monitored and controlled.

Such a best demonstrated mode determined for any suitable number of parameters can be used to build a predictive model of a pattern of behavior of the respective parameters over time. A best demonstrated mode can further be continually refined in response to new measurements of the energy contribution rates of the respective parameters.

Furthermore, the best demonstrated mode can be used to build a respective temporary model of the current behavior of the corresponding parameters.

The usage of such a best demonstrated mode for respective parameters is useful to indicate a potential possible enhancement of the energy consumption rates of the respective single parameters and helps to influence explicitly those parameters which are realistic to be influenced effectively.

Furthermore, it is also possible that an alert is triggered when the energy consumption rate of at least one parameter for which a best demonstrated mode is determined, is detected to deviate unexpectedly from this best demonstrated mode.

Implementations of the various techniques described herein and associated with the proposed method and system to transform measurable energy usage data into categorized energy efficiency data may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) needed for implementation of the proposed method and system, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the present disclosure.

The invention claimed is:

1. Computer-implemented method for monitoring analyzing and simulating energy consumption of a chemical plant in operation, the method comprising determining a plant-type specific theoretical energy consumption optimum value (TEO) that are used for monitoring current data and/or a predictive model based on fundamental natural laws for planning future energy consumptions by using projections, based on a comparative corresponding model plant, identifying and grouping parameters of dynamic and static processes, contributing to increased energy consumption of the plant by assigning the parameters to a list comprising at least chemical process, infrastructure, plant characteristics, partial load, downtime, product mix, plant operational parameters and losses, providing energy contribution rates for each parameter identified by the grouping, partly by an automatic and/or periodic retrieval, further providing by means of an implemented algorithm a transformation of measured and grouped, static and dynamic data into efficiency data, and periodically graphing the energy consumption of the plant via a grouped bar graph starting from the plant type specific theoretical energy consumption optimum value and arriving at a current energy consumption value (CEC) of the plant by adding the provided single energy consumption rates of the respective static and dynamic parameters in groups, thus forming an energy cascade which allows to monitor and/or to predict at least a part of the individual parameters and to compare the current energy consumption of the plant with an energy consumption of another plant and/or with a previous energy consumption of the plant with respect to the parameters of the list.

2. The method according to claim 1, wherein the energy consumption of the plant is normalized using the plant type specific theoretical energy consumption optimum value (TEO), thereby providing for a plant type independent comparison of the energy consumption of the plant with an energy consumption of another plant with respect to the individual parameters.

3. The method according to claim 1, wherein the steps of determining the plant type specific theoretical energy consumption optimum value based on a corresponding model plant, and on identifying and grouping the parameters, are designed for standardization.

4. The method according to claim 1, wherein the model plant produces a specific product in an idealized way exempt from further influencing factors.

5. The method according to claim 1, wherein the parameters due to operating conditions of the plant are classified in static parameters and dynamic parameters.

6. The method according to claim 5, wherein the step of periodically graphing the energy consumption of the plant via a grouped bar graph starting from the theoretical energy consumption optimum value (TEO) and arriving at a current energy consumption (CEC) of the plant by adding the retrieved single rates of the respective parameters in groups including a periodically repeated re-graphing of the rates of the dynamic parameters associated with the operating conditions of the plant.

7. The method according to claim 6, further comprising the step of computing the parameters of the energy cascade a best demonstrated mode, for demonstrating an expected proportion of the respective energy contribution rate of at least one parameter.

8. The method according to claim 7, wherein the best demonstrated mode is derived from a history of the energy contribution rates of the parameter measured over the course of a pre-defined time period wherein a pre-given percentage of the lowest of those energy consumption rates is used for determining the best demonstrated mode.

9. The method according to claim 7, wherein the energy contribution rates of the at least one parameter are continuously monitored and controlled on the basis of the best demonstrated mode.

10. The method according to claim 7, wherein the best demonstrated mode is used to build a predictive model of a pattern of behavior of the respective at least one parameter over time.

11. The method according to any one of claim 7, wherein the best demonstrated mode is continually refined in response to new measurements of the energy contribution rates of the at least one parameter.

12. The method according to claim 7, wherein the best demonstrated mode is used to build a temporary model of the current behavior of the at least one parameter.

13. The method according to claim 7, wherein an alert is triggered when the energy consumption rate of the parameter is detected to deviate unexpectedly from the best demonstrated mode.

14. The method according to claim 4, wherein the influencing factors are location infrastructure and economies of scale.

15. A non-transitory information carrier including tangibly a computer program product, the computer-program product comprising instructions that when executed cause a processor to perform the method to monitor and analyze and simulate energy consumption of a chemical plant in operation, comprising determination of a plant-type specific theoretical energy consumption optimum value (TEO) for the plant, that are used for monitoring current data and/or a predictive model based on fundamental natural laws for planning future energy consumptions by using projections, based on a comparative corresponding model plant, identification and grouping parameters of dynamic and static processes, contributing to increased energy consumption of the plant i) resulting from processes performed in by assigning the parameters to a list comprising at least the plant, ii) resulting from internal characteristics of the plant, and iii) resulting from operating conditions of the plant respectively, chemical process, infrastructure, plant characteristics, partial load, downtime, product mix, plant operational parameters and losses, providing energy contribution rates for each parameter identified by the grouping, partly by an automatic and/or whenever required, periodic retrieval, further providing by means of an implemented algorithm a transformation of measured and grouped, static and dynamic data into efficiency data, and periodically graphing the energy consumption of the plant via a grouped bar graph starting from the plant type specific theoretical energy consumption optimum value (TEO) and arriving at a current energy consumption value (CEC) of the plant by adding the provided single energy consumption rates of the respective static and dynamic parameters in groups, thus forming an energy cascade which allows to monitor and/or to predict at least a part of the individual parameters and to compare the current energy consumption of the plant with an energy consumption of another plant and/or with a previous energy consumption of the plant with respect to the individual parameters of the list displaying the results of monitoring and analyzing the energy consumption.

16. An energy management system comprising:

a modeling means configured to determine, based on a model plant, a plant type specific theoretical energy consumption optimum value which is being used as a reference and, thus, for planning future energy consumption by using projections based on a predictive model;

an analyzing means configured to identify and group parameters of dynamic and static processes, which contributing to an increased energy consumption of the plant by assigning the parameters to a list comprising at least a chemical process, infrastructure, plant characteristics, partial load, downtime, product mix, plant operational parameters and losses;

a provisioning means configured to provide energy contribution rates of the respective parameter, the provisioning means comprising a retrieval means configured for automatic and/or periodic retrieval of energy contribution rates of at least a part of the respective parameters, and a monitor and control means configured for periodically graphing the energy consumption of the plant via a grouped bar graph starting from the theoretical energy consumption optimum value and arriving at a current energy consumption of the plant by adding the provided single energy consumption rates of the respective parameters in groups, thus forming an energy cascade which allows to monitor at least a part of the individual parameters and to compare the current energy consumption of the plant using a self-calibrating performance scale with an energy consumption of another plant and/or with a previous energy consumption of the plant with respect to the individual parameters of the list.

* * * * *